United States Patent [19]

Georgis et al.

[11] Patent Number: 4,843,495
[45] Date of Patent: Jun. 27, 1989

[54] CYCLICAL SERVO ZONE TRACKING METHOD AND APPARATUS FOR HELICAL SCAN RECORDING DEVICES

[75] Inventors: Steven P. Georgis; Kelly J. Beavers, both of Boulder; Steve E. Haugland, Longmont, all of Colo.

[73] Assignee: Exabyte Corporation, Boulder, Colo.

[21] Appl. No.: 57,296

[22] Filed: May 11, 1987

[51] Int. Cl.$^4$ ............... G11B 15/467; G11B 5/588
[52] U.S. Cl. ...................... 560/77.15; 360/73.08; 360/70
[58] Field of Search .............. 360/71, 73, 77, 78, 360/70

[56] References Cited

U.S. PATENT DOCUMENTS

| | | | |
|---|---|---|---|
| 4,044,388 | 8/1977 | Metzger | 360/70 |
| 4,402,023 | 8/1983 | Hiraguri | 360/77 |
| 4,528,605 | 7/1985 | Hiraguri | 360/77 |
| 4,544,966 | 10/1985 | Taniguchi et al. | 360/75 |
| 4,665,447 | 5/1987 | Odaka | 360/78 |
| 4,679,098 | 7/1987 | Williams et al. | 360/73 |

FOREIGN PATENT DOCUMENTS 0117753 5/1984 European Pat. Off. .
0171266 12/1986 European Pat. Off. .
53-17302 2/1978 Japan .

OTHER PUBLICATIONS

IBM-TDB, vol. 18, No. 10, Mar. 1976, R. K. Oswald, Track Following Servo System, pp. 3424-3425.
IBM-TDB, vol. 19, No. 3, Aug. 1976, Lewkowicz et al., Tri-Bit Servo Detection, pp. 810-813.

*Primary Examiner*—Aristotelis M. Psitos
*Assistant Examiner*—David L. Robertson
*Attorney, Agent, or Firm*—Griffin, Branigan & Butler

[57] ABSTRACT

A tracking system and method are disclosed for a helical-scan recording device to automatically maintain the recording/playback heads in alignment with the stripes of recorded information on the magnetic tape. Each stripe on the magnetic tape includes a servo area having four distinct zones. An analog servo signal at a preselected frequency is recorded on one of the four zones on each stripe and is recorded at different ones of the four zones in succession on each group of four adjacent stripes. The servo signal recorded on the stripes is detected during playback and processed to maintain the desired head positioning relative to the stripes on the tape. The servo head is preferably maintained between adjacent stripes on the magnetic tape and signals detected from each of the adjacent stripes maintain head alignment by shifting the positioning of the head in either direction as needed.

34 Claims, 5 Drawing Sheets

Fig_2

Fig_1

Fig_3

Fig_4

Fig_5

Fig_7

Fig_8

Fig_10A

Fig_10B

Fig_10C

Fig_9

CYCLICAL SERVO ZONE TRACKING METHOD AND APPARATUS FOR HELICAL SCAN RECORDING DEVICES

FIELD OF THE INVENTION

This invention relates to a tracking system and method for a recorder/playback device, and, more particularly, relates to a tracking system and method for a helical scan recording device to achieve and maintain head alignment.

BACKGROUND OF THE INVENTION

Magnetic tape recording is well known, and, more recently, helical-scan recording has been utilized, particularly in connection with video/audio applications. As is well known, in helical-scan recording, the recording/pickup heads are positioned on a drum and the drum oriented at an angle with respect to the direction of travel of the magnetic tape so that data is recorded on the magnetic tape by stripes. An example of the helical scanning technique is shown in U.S. Pat. No. 4,613,912.

It is likewise well known that the heads must be aligned, and then maintained in alignment, with the recorded data on the magnetic tape in order for data recovery to be effected during subsequent playback. Various systems and/or methods have been heretofore suggested for aligning and maintaining alignment of the heads, but none of these systems and/or methods have been completely satisfactory in achieving this desired end. By way of example, at least some prior known systems, including helical-scan systems have required the use of multiple frequencies and precisely aligned filters, as well as complex detectors and processing electronics.

SUMMARY OF THE INVENTION

This invention provides a tracking system and method for helical-scan recording devices to determine lack of alignment between the recording/playback heads and the stripes of recorded information on magnetic tape, as well as utilizing determined misalignment to adjust the relative positioning between the heads and tape to achieve and maintain a desired alignment therebetween.

Each stripe of the magnetic tape includes a servo portion, and each servo portion is subdivided into a plurality of zones. An analog servo signal, having a constant single frequency, is recorded on a different zone on each stripe of a group of adjacent stripes equal in number to the number of zones, with the analog servo signal being sequentially recorded on different zones of each group of adjacent stripes.

It is therefore an object of this invention to provide an improved tracking system and method for helical-scan recording devices.

It is another object of this invention to provide an improved tracking system and method for helical-scan recording devices for detecting misalignment between the heads and stripes of recorded data on the magnetic tape.

It is still another object of this invention to provide an improved tracking system and method for use with a helical-scan recording device to cause relative movement between the recording/playback heads and the stripes of recorded data on magnetic tape to correct detected misalignment therebetween.

It is still another object of this invention to provide an improved tracking system and method for a helical-scan recording device wherein an analog servo signal is recorded at different zones in the servo area of each stripe to detect misalignment.

It is still another object of this invention to provide an improved tracking system and method for use with a helical-scan recording device for automatically maintaining the recording/playback heads in alignment with the stripes of recorded information on magnetic tape.

With these and other objects in view, which will become apparent to one skilled in the art as the description proceeds, this invention resides in the novel construction, combination, arrangement of parts and method substantially as hereinafter describe, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
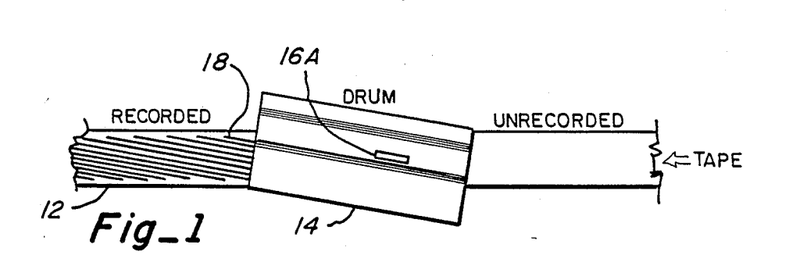
FIG. 1 is a schematic illustration of recording by stripes on magnetic tape utilizing a helical-scan arrangement.
Figure 2:
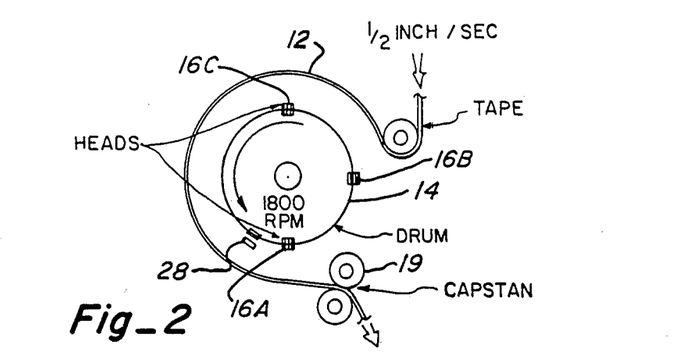
FIG. 2 is a schematic illustration of head placement on a drum rotating adjacent to magnetic tape wrapped partially around the drum to effect helical-scan recording as illustrated in FIG. 1.

Referring to the drawings, a helical-scan arrangement for recording on magnetic tape 12 is illustrated in FIGS. 1 and 2.

As best illustrated in FIG. 1, drum 14 is angularly oriented with respect to the edges and direction of travel of magnetic tape 12. As indicated in FIG. 2, drum 14 has heads 16A, 16B, and 16C mounted thereon to establish a physical relation between the heads on the drum and the tape. By this arrangement, data is recorded on the tape at an angle with respect to the direction of travel of the tape, and hence, as indicated in FIG. 1, is recorded as discrete stripes 18 when the drum is rotated at a high speed relative to the speed of the tape. As indicated in FIG. 2, the tape is preferably moved at a rate of one-half inch per second while the drum is rotated at 1800 rpm, the tape speed being controlled by the rotational speed of capstan 19. It is to be realized, however, that the operating speeds as set forth are by way of example and the invention is not meant to be limited thereto.

Figure 3:
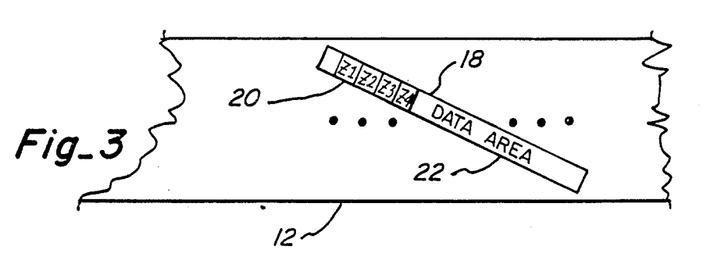
FIG. 3 is an illustration of one of the stripes shown in FIG. 1, and illustrates the servo area and divided zones thereof.

Tape stripe 18 is illustrated in more detail in FIG. 3, and shows the relation of servo tracking area 20 of the stripe relative to data area 22. It is meant to be realized that the illustration of FIG. 3 (as well as that of FIGS. 4 and 5) has not been made to scale, and is meant only to illustrate placement of the servo tracking area at the beginning of each stripe.

In the preferred embodiment of this invention, servo tracking area 20 includes four zones Z1, Z2, Z3, and Z4. Each stripe has an analog servo signal recorded in only one zone, and this signal is used for detecting misalignment between the heads and stripes on the tape.

Figure 4:
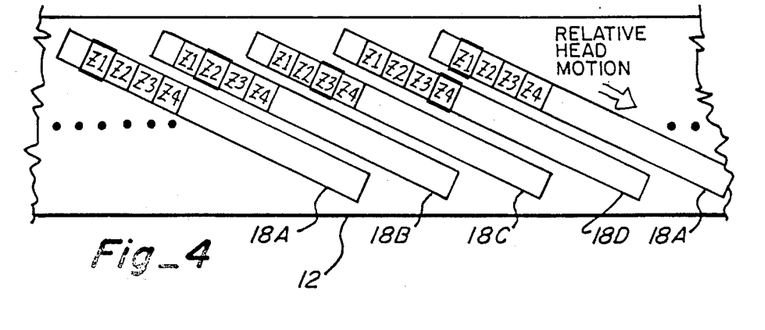
FIG. 4 is an illustration of a plurality of adjacent stripes shown in FIG. 1, and illustrates successive recording of an analog servo signal on different zones of a group of stripes (after which recording is repeated for the next group as illustrated)

FIG. 4 illustrates a series, or group, of adjacent stripes 18A, 18B, 18C, and 18D, and indicates that the group then repeats as shown by the next succeeding stripe 18A. As shown in FIG. 4, the servo signal is successively recorded in a different zone of the group of stripes, with the servo signal being indicated as recorded at zone Z1 in stripe 18A, at zone Z2 in stripe 18B, at zone Z3 in stripe 18C, and at zone Z4 in stripe 18D.

The analog servo signal recorded at each zone has a single frequency, F1. In the preferred embodiment, frequency F1 is approximately 184 KHz, although any frequency that can be recorded and recovered could be used. In a working embodiment of this invention, a servo tracking frequency of 184 KHz was successfully utilized since this frequency was above the low-frequency nonlinear tape media effects, and was below the frequencies generally present in the data recorded in the data area.

Figure 6A:
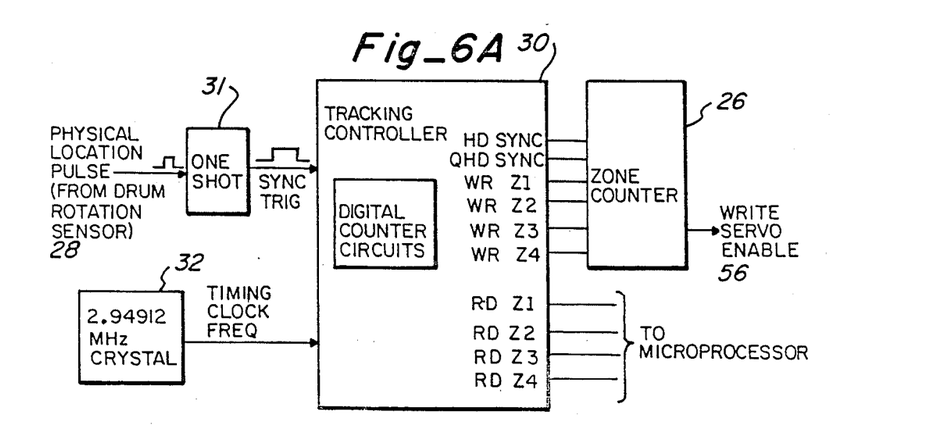
FIG. 6A is a block diagram illustrating the tracking controller, and outputs thereof, utilized in this invention.
Figure 9:
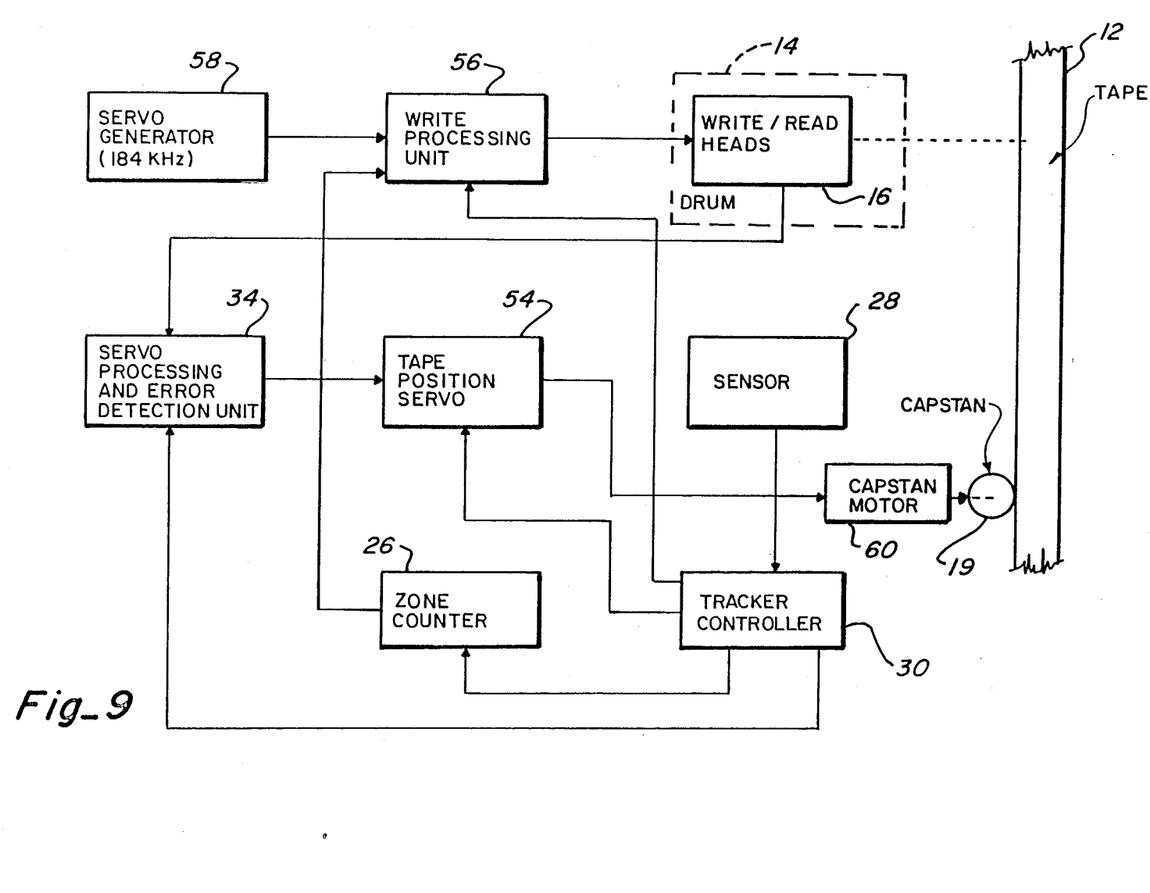
FIG. 9 is a block diagram illustrating the invention.

The zone in which the servo signal is recorded on a given track, or stripe, is sequenced by zone counter 26 (as indicated in FIGS. 6A and 9) according to a fixed cyclic pattern with a length equal to the number of zones. In the preferred embodiment of this invention, zone counter 26 is implemented as a common 2-bit binary counter, but other methods of providing sequencing of the zones are possible, as would be obvious to one skilled in the art.

As can be appreciated from the foregoing, the sequencing of recorded zones repeats for each cycle, with each one of the four zones of each group of adjacent stripes having a servo signal sequentially recorded thereon once during the cycle.

Figure 5:
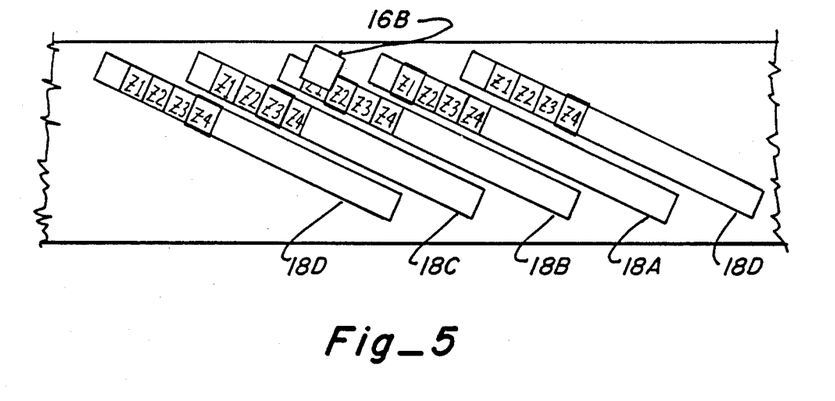
FIG. 5 is an schematic illustration of a plurality of adjacent stripes, as shown in FIG. 4, and illustrates the servo pickup head positioned between a pair of stripes to detect misalignment according to this invention.

When the pickup head passes over the succession of stripes, as indicated in FIG. 5, the servo signal will be detected at the particular zone Z1 through Z4, in which the servo signal was recorded. The sequence of servo signals detected from the four zones will follow the same pattern as that recorded, thus making it possible to identify over which of four zones the pickup head is located at any particular time.

Figure 6B:
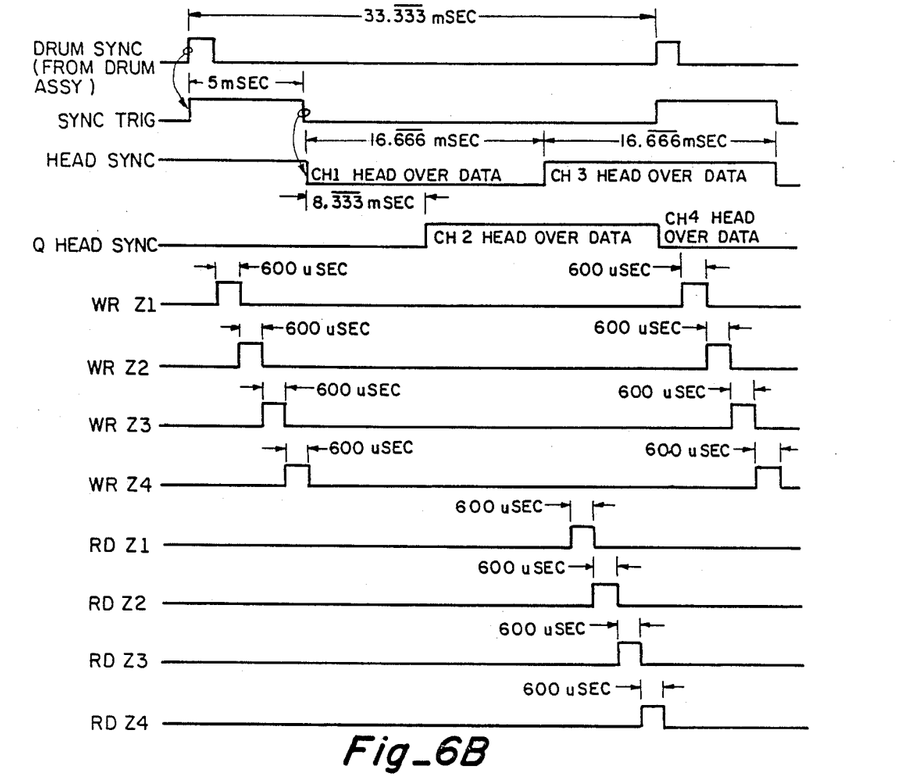
FIG. 6B is a series of waveforms illustrating operation and timing of the tracking controller shown in FIG. 6A.

Each rotation of drum 14 is sensed by sensor 28 (as indicated in FIG. 2 to be positioned adjacent to drum 14 to sense an indicia on the rotating drum) to provide physical location reference pulses (through one-shot 31) to tracking controller 30 (shown in FIG. 6A), which generates timing information as indicated in FIG. 6B. The timing information indicates when the rotating heads are positioned over the data area and servo zones. Tracking controller 30 produces this timing information by generating pulses after fixed delays from the physical location reference pulses supplied from sensor 28. In the preferred embodiment of this invention, tracking controller 30 has connected thereto crystal oscillator 32 (2.94912 MHz) to provide a timing clock frequency, and controller 30 is, essentially, a counter circuit (as indicated by the digital counter circuits block illustrated in FIG. 6A) which can be implemented using a variety of techniques familiar to one skilled in the art.

The timing information provided by tracking controller 30 is used during both writing and reading of the servo signal. During writing, this timing information indicates when the data head is in position to WRITE the servo frequency in the correct zone. During reading, the timing information indicates when the servo pickup head is in position to READ the servo frequency from the correct servo zone. During the recording (writing) process, tracking controller 30 generates timing and control signals that cause the recording circuitry in the tape drive to record the tracking frequency (F1) in each servo zone in the sequential pattern as shown in FIG. 4. Tracking controller 30 also automatically increments zone counter 26 for each revolution of the drum. The pattern of recorded servo zones establishes the necessary information for tracking during subsequent READ operations.

Upon playback, or READ operation, the tracking servo system preferably operates such that the servo head passes directly parallel to and between adjacent recorded stripes. The tracking servo system reads the recorded tracking information from the four servo zones and derives the off-track (i.e., misalignment) and correction information.

The preferred physical relation between the servo pickup head and the servo zones during the READ operation is indicated in FIG. 5. As shown, servo head 16B is positioned between two adjacent stripes, such that the servo frequency can be detected from the two stripes simultaneously. The servo system operates to position the tape to align the servo head directly between the two adjacent stripes during relative motion between the tape servo head and the rotating drum.

Other specific systems or methods of servo head positioning, design and tracking could also be utilized, including, for example, using a pickup head that is positioned with respect to the stripes at an angle other than as is indicated in FIG. 5, and/or physically slightly wider that the stripe width so that the servo head can detect the recorded servo frequency from multiple stripes, even if positioned directly over the center of one stripe.

During the READ operation, the servo zones are sampled upon each alignment of the servo pickup head in the servo area, which occurs once per revolution of the drum. The sequence of values detected from the servo zones are processed by a series of analog and digital signal processing operations to derive off-track error values and direction of needed alignment.

Figure 7:
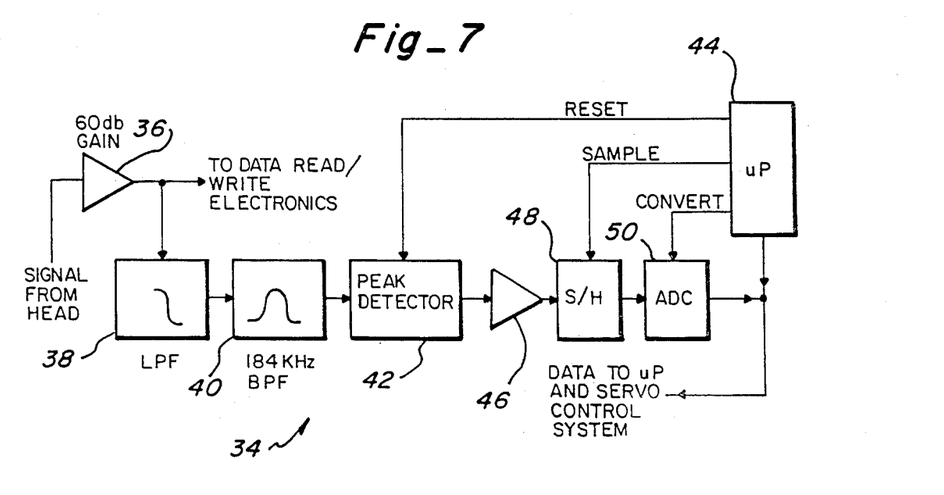
FIG. 7 is a block diagram illustrating the servo signal processing and detecting unit used in this invention.

As shown in FIG. 7, the servo signal detected at the servo pickup head (containing the servo frequency F1) is coupled to the servo processing circuit 34, and, more particularly, is coupled to 60 DB gain stage 36, which amplifies the servo signal. The amplified signal is then coupled to low-pass filter 38, which filter rejects frequencies above the servo frequency to minimize noise and possible corruption from signal bleed due to nearby data areas of the stripes. The low-pass filtered signal is then coupled to bandpass filter 40 having a center frequency corresponding to servo frequency F1. Bandpass filter 40 isolates the servo frequency F1 and further reduces the amplitude of any noise with frequency components outside the bandpass.

The Q (quality factor) and matching of the center frequency of the bandpass filter to the servo frequency F1 are not critical, since the present invention uses only a single servo frequency. Likewise, the quality and cutoff rate of the low-pass filter are not critical.

The filtered signal from bandpass filter 40 is then coupled to analog peak detector 42, which is characterized by a fast attack rate and slow decay rate. Peak detector 42 is resettable by a RESET signal from microprocessor 44 at least once after the servo zone of the stripe has been read, in preparation of the next servo area of the next stripe.

The output from peak detector 42 represents the envelope of the detected servo signal, which indicates the amplitude of the servo frequency as a function of time. By comparing amplitudes of the servo frequency envelope during the four time intervals corresponding to the four servo zones, the tracking error and direction can be determined.

The output from peak detector 42 is coupled through amplifier 46 to sample and hold circuit 48 where the servo frequency envelope is sampled when issued a SAMPLE command from microprocessor 44. Microprocessor 44 issues the SAMPLE signal at times corresponding to the expected positions of the four servo zones on the stripe. Expected occurrences of the servo information is provided to the microprocessor by tracking controller 30 and physical location pulses from sensor 28. The function of sample and hold circuit 48 is to provide a relatively constant signal for subsequent quantization by analog-to-digital converter 50. The process of sampling and analog-to-digital conversion are well known to one skilled in the art.

When given a CONVERT command by microprocessor 44, analog-to-digital converter 50 quantizes the sample signal into representative discrete digital data. This data is then coupled to microprocessor 44 which derives tracking error and position information that is then used to control servo feedback loop system 54, as indicated in FIG. 9. A flow chart indicating the sequence of events provided for by servo processing and error detection unit 34 is provided in FIG. 8.

As also illustrated in FIG. 9, the output from zone counter 26 is coupled to WRITE processing unit 56 for sequentially recording in successive zones from stripe to stripe of the servo signal generated by servo signal generator 58 (i.e., the 184 KHz signal).

Figure 10A:
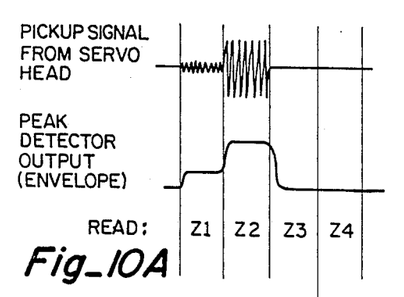
FIGS. 10A, 10B, and 10C are waveforms illustrating typical examples of detected misalignment (FIGS. 10A and 10B) and alignment (FIG. 10C) according to this invention.
Figure 10B:
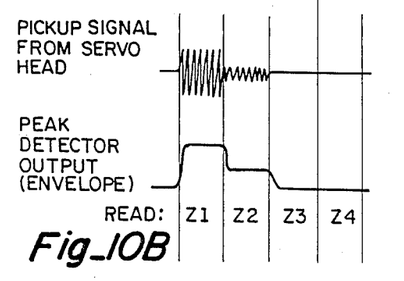
Figure 10C:
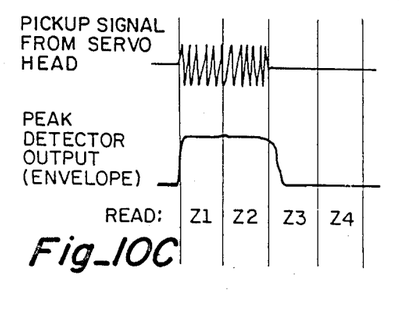

FIG. 10A through 10C illustrate the servo signal waveforms of various stages in the servo processing path, corresponding positions of the servo pickup head, and the methods by which tracking error and direction are derived. While specific reference is made to particular tracking arrangement between zones Z1 and Z2, tracking between the other zones is analogous.

As indicated in FIG. 5, correct servo alignment occurs when the head is positioned exactly between two stripes on the tape. As the head travels between the two stripes, it reads the servo frequency from zones Z1 and Z2, in that order. If the head is correctly positioned between the stripes, the magnitudes of the detected servo envelope will be equal.

Figure 8:
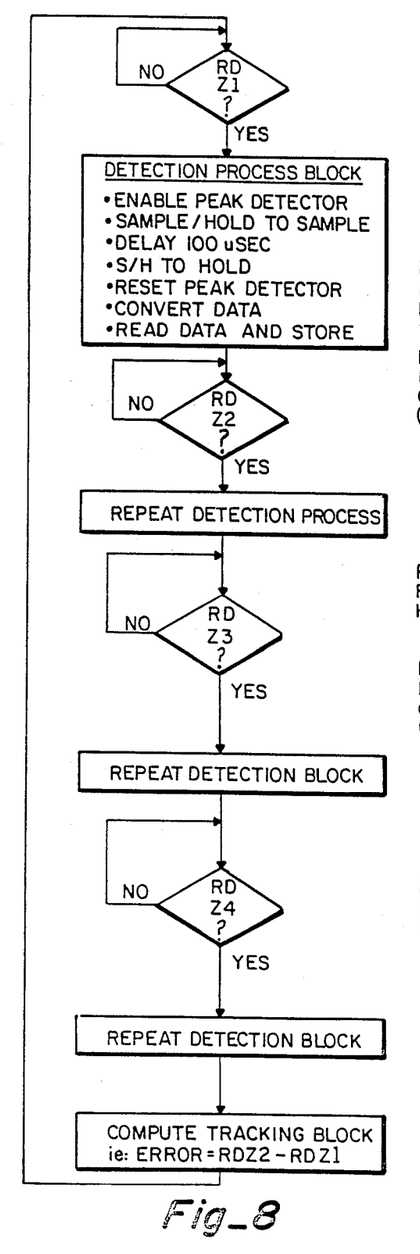
FIG. 8 is a flow diagram indicating the sequence of events provided for by the signal processing and detecting unit shown in FIG. 7 as used in this invention.

FIG. 10A illustrates the effect of misalignment of the head in the direction of zone Z2, which causes the detected envelope of the signal derived from zone Z2 to be larger than that derived from zone Z1. The difference between the amplitudes of the servo frequency envelope derived from zones Z1 and Z2 are calculated by the microprocessor, which provides a tracking error signal back into the servo control system and to tape position servo 54, as indicated in FIG. 8. Tape position servo 54 then modulates the rotation of capstan motor 60 and capstan 19 to thus move the stripes on the tape relative to the heads to force the error signal toward zero, and by this process aligns the head exactly between the stripes (and hence into the correct tracking position). Such servo control action is well known to one skilled in the art.

Conversely, FIG. 10B shows the effect of misalignment in the direction of zone Z1. In this case, the amplitude of the servo envelope derived from zone Z1 is larger than that derived from zone Z2. As in the previous example, the microprocessor provides an error signal and the tape speed is modulated to drive the error signal toward zero.

The correct head alignment results in equal servo envelope amplitudes, as indicated in FIG. 10C. In this condition of equilibrium, the physical tracking error is zero and the difference between the servo envelope amplitudes derived from zones Z1 and Z2 time periods is also zero.

The direction of head misalignment is provided by the polarity of the difference between the servo envelope magnitudes. The servo system adjusts the tape in the direction corresponding to the smaller servo frequency envelope. By this method, servo head correction is bidirectional, which minimizes correction time and assures that correction can be achieved from either side of the correct tracking position. This feature is an advantage over prior tracking systems having an ability to adjust head positioning in only one direction. Such unidirectional servo action has the disadvantage that alignment correction in one of the directions is only possible by skipping to the next sequence of stripes.

As can be appreciated from the foregoing, this invention provides an improved tracking system for detecting misalignment between the heads of a recording/playback device and helical-scan recorded stripes on magnetic tape, and for aligning the heads with respect to such stripes.

What is claimed is:

1. A tracking system for a recording/playback device utilizing recording of data by helical stripes on magnetic tape, said system comprising:
    servo signal generating means for generating a servo signal at a preselected frequency;
    recording and pickup means positionable contiguous to said magnetic tape for recording said servo signal thereon in a WRITE mode and for detection of said servo signal on said tape during a READ mode;

means for transmitting said servo signal generated by said servo generating means to said recording and pickup means;

processing means for processing said servo signal detected at said magnetic tape by said recording and pickup means;

control means for allocating a portion of each stripe for servo tracking purposes, said allocated portion of each stripe comprising a predetermined plurality of at least three servo zones, each servo zone being an interval on said stripe over which said servo signal is recordable, each of said servo zones being located in corresponding positions on each stripe, wherein during said WRITE mode said control means causes said servo signal to be recorded in only one of said servo zones for each stripe whereby, for a group of stripes comprised of said predetermined number of adjacent stripes, the particular one of said zones wherein said servo signal is recorded differs from the zones wherein said servo signal is recorded on other stripes in said group, and wherein said control means causes said processing means to provide an output indicative of said servo signal detected on two adjacent stripes during said READ mode; and error detecting means for receiving said output indicative of said servo signal from said processing means and responsive thereto and for developing an error signal indicative of sensed misalignment between said recording and pickup means and said stripes on said magnetic tape.

2. The system of claim 1 wherein said signal generating means generates an analog servo signal that is separately recorded at said different zones on said plurality of stripes on said magnetic tape.

3. The system of claim 2 wherein said analog servo signal is recorded in one of four zones on said plurality of stripes.

4. The system of claim 2 wherein said analog servo signal is above a frequency that would be adversely affected by non-linear tape effects and below the frequency of data to be recorded on said tape.

5. The system of claim 2 wherein said analog servo signal is about 184 KHz.

6. The system of claim 1 wherein said processing means includes peak detector means for detecting servo signals on said tape.

7. The system of claim 6 wherein said processing means includes:

amplifying means and filter means connected with an input side of said peak detector means;

sample and hold means connected with an output side of said peak detector means; and, analog-to-digital converter means connected with an output side of said sample and hold means.

8. The system of claim 1 wherein said control means includes tracking controller means for establishing said WRITE and READ modes.

9. The system of claim 8 wherein said system includes rotatable drum means having said recording and playback means mounted thereon, and wherein said system further comprises:

sensor means for sensing rotating of said drum means to provide timing signals for said tracking controller means.

10. The system of claim 1 wherein said error detecting means includes microprocessor means for determining said sensed misalignment between said recording and pickup means and said stripes.

11. The system of claim 1 wherein said system includes alignment means for causing relative movement between said recording and pickup means and said stripes on said magnetic tape.

12. The system of claim 1, wherein said zones are contiguously and sequentially arranged on each of said stripes.

13. The system of claim 1, wherein the particular one of said predetermined plurality of servo zones in which said servo signal is recorded for any given stripe is determined in a cyclical pattern with a pattern length equal to said predetermined plurality.

14. The system of claim 1, further comprising:

bidirectional alignment means for evaluating the amplitudes of the servo signal derived from adjacent ones of said stripes and for using said evaluation to determine a required direction for properly positioning said recording and pickup head means between adjacent ones of said spaced-apart stripes.

15. A method for aligning heads of a recording/playback device with helical-scan recorded stripes on magnetic tape, said method comprising:

generating a servo signal at a preselected frequency;

providing a servo area on each of said stripes, said servo area comprising a predetermined plurality of at least three servo zones, each servo zone being an interval on said stripe over which said servo signal is recordable, each of said servo zones being located in corresponding positions on each stripe, recording information including said servo signal on a plurality of stripes on said magnetic tape using a recording/playback head said servo signal being recorded in only one of said servo zones;

controlling the recording of said servo signal on each of said stripes whereby, for a group of stripes comprised of said predetermined number of adjacent stripes, the particular one of said zones wherein said servo signal is recorded differs from the zones wherein said servo signal is recorded on other stripes in said group;

detecting said servo signal on two adjacent ones of said stripes; and utilizing said detected servo signal to ascertain errors in alignment between said head and said stripes on said tape.

16. The method of claim 15 wherein said method includes providing four said servo zones and sequentially recording said servo signal in a different adjacent zone of each adjacent stripe.

17. The method of claim 15 wherein said method includes detecting servo signals on adjacent stripes and developing signals with respect thereto having amplitudes dependent upon alignment between said heads and said stripes, and comparing the amplitudes of said developed signals to ascertain said errors in adjustment.

18. The method of claim 15 wherein said method includes utilizing said ascertained errors to correct misalignment between said heads and said stripes.

19. The method of claim 15, wherein said zones are contiguously and sequentially arranged on each of said stripes.

20. The method of claim 15, wherein the particular one of said predetermined plurality of servo zones in which said servo signal is recorded for any given stripe is determined in a cyclical pattern with a pattern length equal to said predetermined plurality.

21. The method of claim 15, further comprising:
evaluating the amplitudes of the servo signal derived from adjacent ones of said stripes and using said evaluation to determine a required direction for properly positioning said recording and pickup means between adjacent ones of said stripes.

22. A tracking system for a recording/playback device utilizing recording of data by helical stripes on magnetic tape, said system having rotatable drum means angularly oriented with respect to a direction of travel of said magnetic tape; servo signal generating means for generating a servo signal at a preselected frequency; information recording and pickup head means mounted on said drum means for recording information including said servo signal on said tape in a WRITE mode in helical stripes of information on said tape and for detecting information on said tape in a READ mode; servo pickup head means mounted on said drum for detecting said servo signal in a READ mode; means for processing said servo signal detected at said magnetic tape by said servo pickup head means; wherein the improvement comprises:
control means for allocating a portion of each stripe for servo tracking purposes, said allocated portion of each stripe comprising a predetermined plurality of at least three servo zones, each servo zone being an interval on said stripe over which said servo signal is recordable, each of said servo zones being located in corresponding positions on each stripe, wherein during said WRITE mode said control means causes said servo signal to be recorded in only one of said servo zones for each stripe whereby, for a group of stripes comprised of said predetermined number of adjacent stripes, the particular one of said zones wherein said servo signal is recorded differs from the zones wherein said servo signal is recorded on other stripes in said group, and wherein said control means causes said processing means to provide an output indicative of said servo signal detected on two adjacent stripes during said READ mode; and,
error detection means for receiving said output indicative of said servo signal from said processing means and responsive thereto and for developing an error signal when said servo pickup head means is not properly positioned between adjacent ones of said helical stripes.

23. The system of claim 22, wherein said analog servo signal is recorded in one of four zones on said plurality of stripes.

24. The system of claim 22, wherein said system includes alignment means for causing relative movement between said head means and said stripes on said magnetic tape.

25. The system of claim 22, wherein said zones are continuously and sequentially arranged on each of said stripes.

26. The system of claim 22, wherein the particular one of said predetermined plurality of servo zones in which said servo signal is recorded for any given stripe is determined in a cyclical pattern with a pattern length equal to said predetermined plurality.

27. The system of claim 22, further comprising:
bidirectional alignment means for evaluating the amplitudes of the servo signal derived from adjacent ones of said stripes and using said evaluation to determine a required direction for properly positioning said servo pickup head means between adjacent ones of said stripes.

28. A tracking method for aligning heads of a recording/playback device with helical scan recorded stripes on magnetic tape, said method including generating a servo signal at a preselected frequency; using information recording and pickup head means mounted on drum means for recording information including said servo signal on said tape in a WRITE mode in helical stripes of information on said tape and for detecting information on said tape in a READ mode; using servo pickup head means mounted on said drum for detecting said servo signal in a READ mode; processing said servo signal detected at said magnetic tape by said servo pickup head means; wherein the improvement comprises:
allocating a portion of each stripe for servo tracking purposes, said allocated portion of each stripe comprising a predetermined plurality of at least three servo zones, each servo zone being an interval on said stripe over which said servo signal is recordable, each of said servo zones being located in corresponding positions on each stripe;
recording during said WRITE mode said servo signal in only one of said servo zones for each stripe whereby, for a group of stripes comprised of said predetermined number of adjacent stripes, the particular one of said zones wherein said servo signal is recorded differs from the zones wherein said servo signal is recorded on other stripes in said group;
providing an output indicative of said servo signal detected on two adjacent stripes during said READ mode; and,
utilizing said detected servo signal to ascertain errors in alignment between said heads and said stripes on said tape.

29. The method of claim 28, wherein said method includes providing four of said servo zones and sequentially recording said servo signal in a different adjacent zone of each adjacent stripe.

30. The method of claim 28, wherein said method includes detecting servo signals on adjacent stripes and developing signals with respect thereto having amplitudes dependent upon alignment between said heads and said stripes, and comparing the amplitudes of said developed signals to ascertain said errors in adjustment.

31. The method of claim 28, wherein said method includes utilizing said ascertained errors to correct misalignment between said head and said stripes.

32. The method of claim 28, wherein said zones are continuously and sequentially arranged on each of said stripes.

33. The method of claim 28, wherein the particular one of said predetermined plurality of servo zones in which said servo signal is recorded for any given stripe is determined in a cyclical pattern with a pattern length equal to said predetermined plurality.

34. The method of claim 28, further comprising:
evaluating the amplitudes of the servo signal derived from adjacent ones of said stripes and using said evaluation to determine a required direction for properly positioning said servo pickup head means between adjacent ones of said stripes.

* * * * *